Jan. 14, 1958 J. F. KOPCZYNSKI 2,819,767
TRACTION DRIVE FOR VEHICLES HAVING NON-CIRCULAR WHEELS
Filed Aug. 25, 1953 6 Sheets-Sheet 2
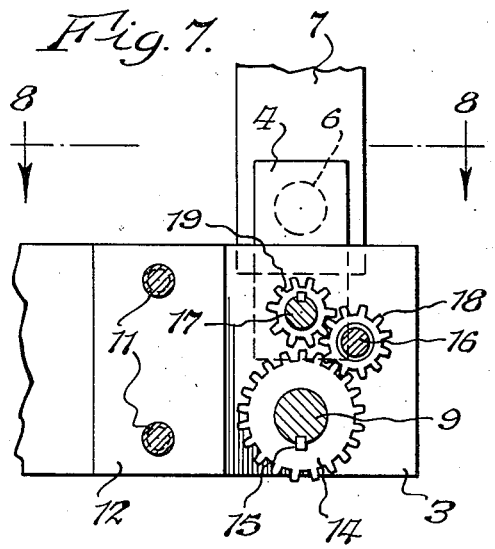
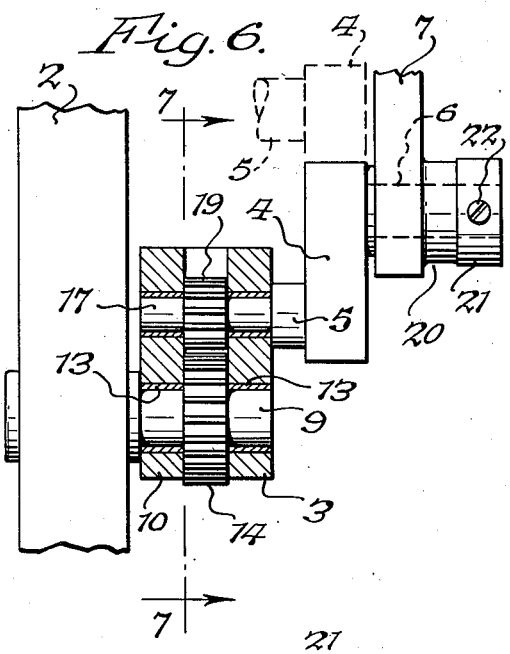
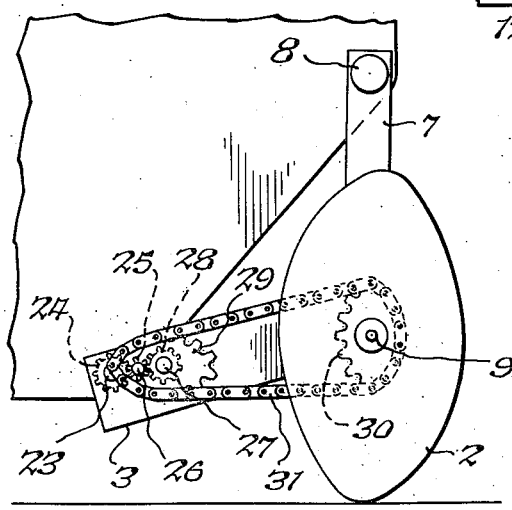
INVENTOR.
John F. Kopczynski,
BY
Parker, Prochnow & Farmer,
Attorneys.

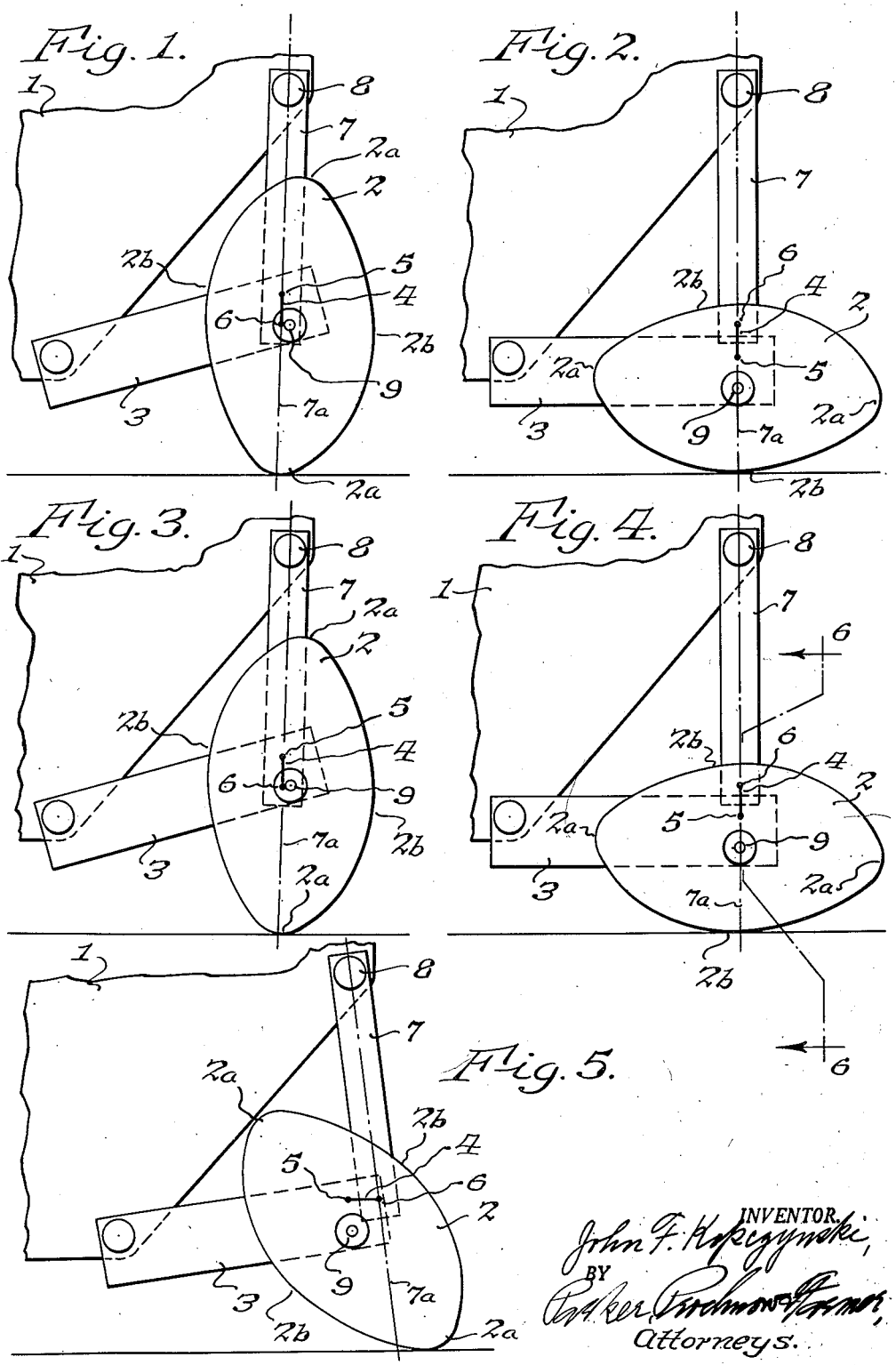

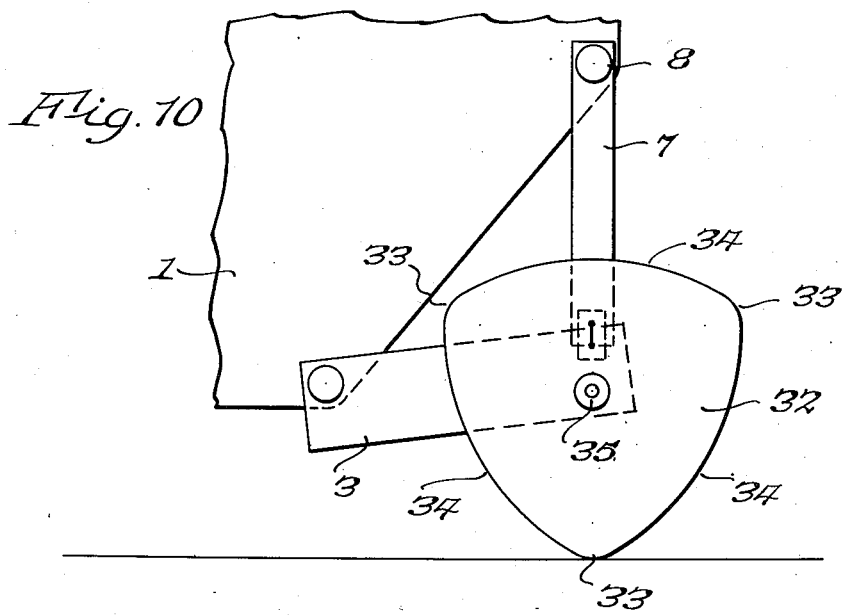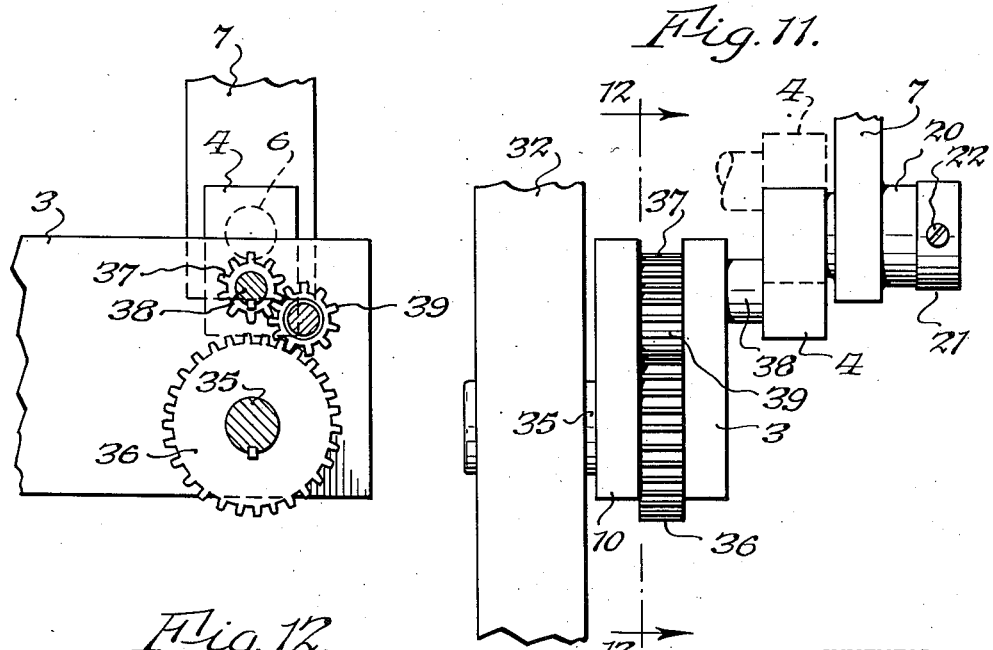

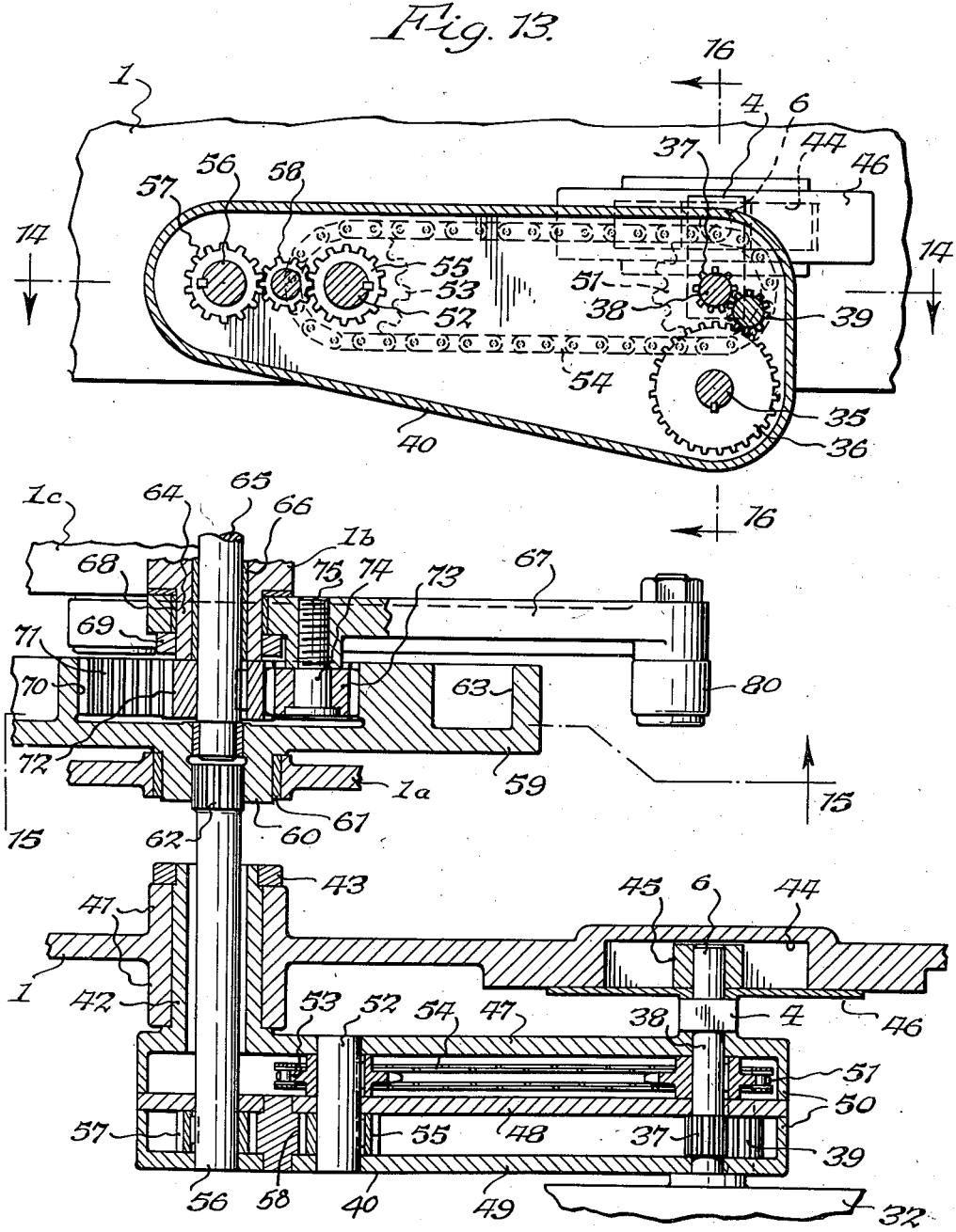

Jan. 14, 1958 J. F. KOPCZYNSKI 2,819,767
TRACTION DRIVE FOR VEHICLES HAVING NON-CIRCULAR WHEELS
Filed Aug. 25, 1953 6 Sheets-Sheet 5
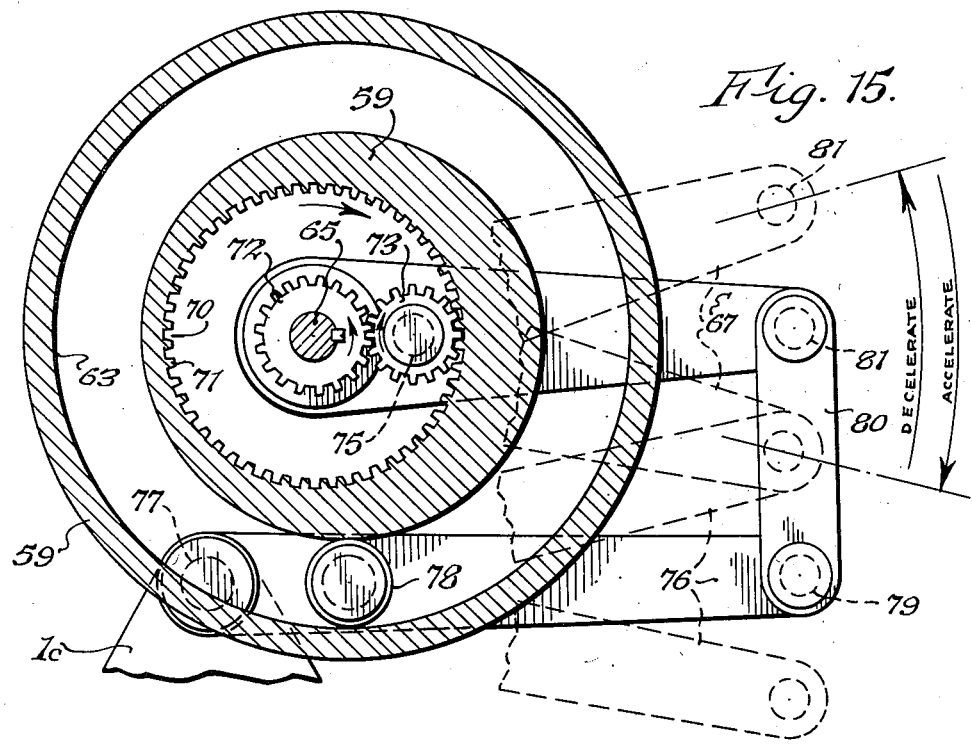
Fig. 15.
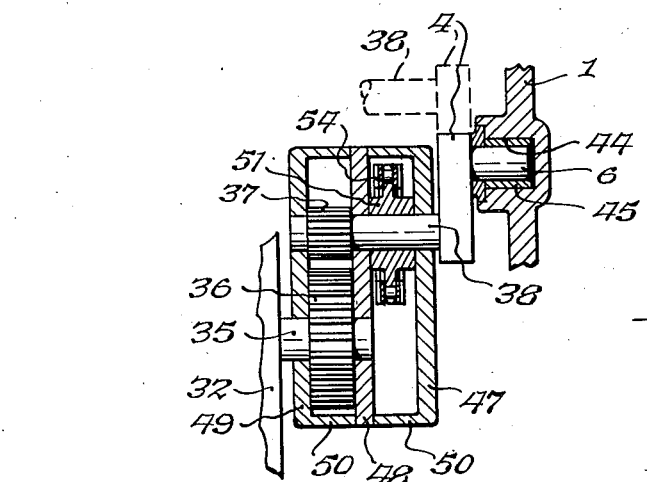
Fig. 16.
Fig. 14a.
INVENTOR.
John F. Kopczynski,
BY
Parker, Rochman & Taymor,
Attorneys.

Jan. 14, 1958 J. F. KOPCZYNSKI 2,819,767
TRACTION DRIVE FOR VEHICLES HAVING NON-CIRCULAR WHEELS
Filed Aug. 25, 1953 6 Sheets-Sheet 6
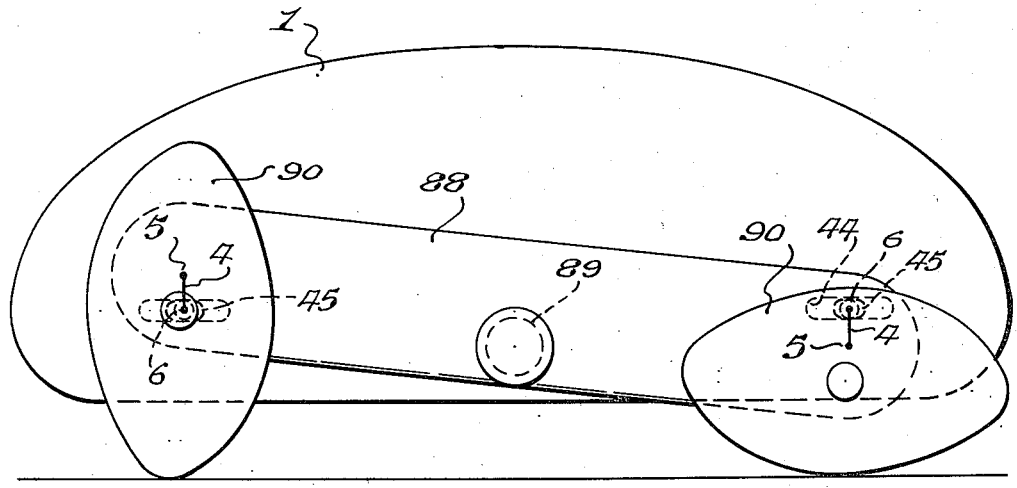
Fig. 17.
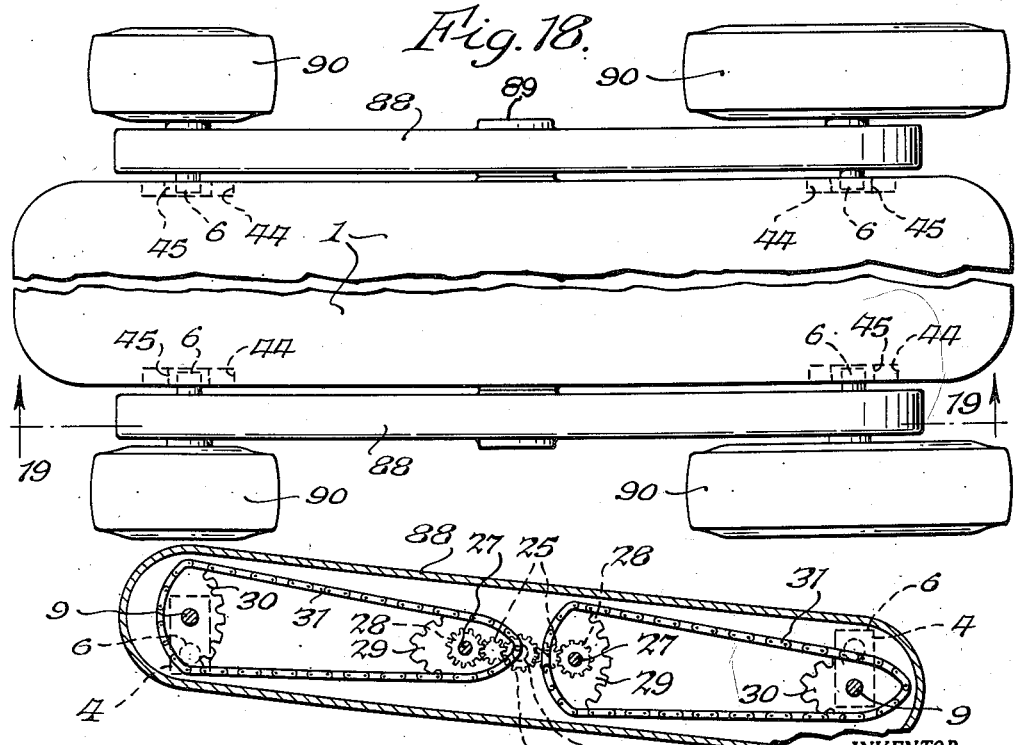
Fig. 18.
Fig. 19.
INVENTOR.
John F. Kopczynski,
BY
Parker, Brochman & Parmer,
Attorneys.

United States Patent Office 2,819,767
Patented Jan. 14, 1958

2,819,767

TRACTION DRIVE FOR VEHICLES HAVING NON-CIRCULAR WHEELS

John F. Kopczynski, Buffalo, N. Y.

Application August 25, 1953, Serial No. 376,341

15 Claims. (Cl. 180—7)

This invention relates to vehicles, and particularly to an improved traction drive therefor. It is in the nature of an improvement upon the structure disclosed and claimed in my copending application Serial No. 172,091 filed July 5, 1950, now Patent Number 2,711,221 of June 21, 1955. In that copending application I have disclosed and claimed a traction drive for a vehicle, using traction wheels with oblate treads or ground-engaging peripheries, mounted to rotate on opposite ends of an arm which is pivoted midway of its ends on the vehicle frame, and the driving power for the wheels is delivered through a shaft concentric with the axis of rocking of the arm.

An object of this invention is to provide a self-propelled vehicle with an improved wheel drive and support which may utilize a traction wheel that has a ground-engaging periphery with a plurality of convex crests spaced equally around the wheel, connected by convex curves closer to the radius of the wheel than said crests, which will operate successfully with traction wheels on only one end of the rocking arm, which will provide maximum propelling traction over a plurality of different types of roads, and which may be operated at low, medium or high speeds, as desired, during which the vehicle body will not be given vertical movements by the non-circular periphery of the traction wheel, and which will be relatively strong, sturdy, durable, simple and inexpensive.

Another object is to provide improved propelling means for a self-propelled vehicle, which will have maximum traction of the drive wheels on many different types of roadway, and which will have greater driving traction than circular tread wheels.

A further object is to simplify and improve the performance of the traction device of my above identified application.

Further objects and advantages will appear from the following description of a few embodiments of the invention, and the novel features will be particularly pointed out hereinafter in connection with the appended claims.

In the accompanying drawings:

Figs. 1 to 5 inclusive are diagrams illustrating in a simple manner the principle of operation of the improved traction device, with the parts shown in different relative positions taken during a revolution of the traction wheel;

Fig. 6 is a sectional elevation through one of the traction devices, corresponding to a section taken approximately along the line 6—6 of Fig. 4;

Fig. 7 is a sectional elevation through the same mechanism, but with the section taken approximately along the line 7—7 of Fig. 6;

Fig. 8 is a sectional plane of the same, but with the section taken approximately along the line 8—8 of Fig. 7;

Fig. 9 is a view similar to the diagram of Fig. 1, of one form of driving mechanism for the oblate wheel;

Fig. 10 is a diagram similar to Fig. 1, but illustrating the use of a somewhat triangular traction wheel instead of the oblate wheel;

Fig. 11 is a side elevation of mechanism somewhat similar to Fig. 6 but adapted for the wheel shown in Fig. 10;

Fig. 12 is a sectional elevation of the same mechanism and similar to Fig. 7, but applied to the traction wheel shown in Fig. 10, the section being taken approximately along the line 12—12 of Fig. 11;

Fig. 13 is a sectional elevation, illustrating a drive to the traction wheel shown in Fig. 10;

Fig. 14 is a sectional plan of a corner of a vehicle supported by a traction wheel of the type shown in Fig. 10, and driven by the mechanism shown in Fig. 13, the section being taken approximately along the line 14—14, Fig. 13;

Fig. 14a is an elevation of a modified connection that may be employed between the crank pin and the vehicle frame;

Fig. 15 is a sectional elevation of a part of the same, the section being taken approximately along the line 15—15 of Fig. 14;

Fig. 16 is a transverse, sectional elevation of a portion of the same, the section being taken approximately along the line 16—16 of Fig. 13;

Fig. 17 is a side elevation of a simple form of vehicle using oblate traction wheels;

Fig. 18 is a plan of the same; and

Fig. 19 is a sectional elevation of a part of the same, the section being taken approximately along the line 19—19 of Fig. 18.

Referring first to Figs. 1 to 5, the basic principles involved in this improved traction drive will be first explained. The vehicle 1, only one corner of which is illustrated, is supported at each of its corners by a non-circular wheel 2. In this particular illustration, the wheel 2 is generally oblate or elliptical in circumference, along the tread, with major and minor axes. A lever or arm 3 is pivoted to the vehicle 1 so as to extend in a lengthwise direction and somewhat horizontally. On the free end of the arm 3, a crank arm 4 is pivoted to rotate about an axis 5, and the free end of the crank arm has a crank pin 6 which is pivoted to the lower end of a generally vertically disposed link or lever 7 that is pivoted by pivot pin 8 to the vehicle 1. The crank arm 4 is rotated at twice the rate of rotation of the wheel 2 by mechanism which will be explained a little later herein, and which mechanism is carried on the arm 3.

With the parts in the positions shown in Fig. 1, let it be assumed that the vehicle 1 is travelling to the left in that figure. At this time the crank arm 4 depends from its axis of rotation or crank shaft, and when it moved into that position it raised the arm 3, at its free end, to the full extent of the radius of the crank arm. As the vehicle moves to the left in Fig. 1, the wheel 2 will move from the present position in Fig. 1, where its major axis is vertical, to the Fig. 2 position, which is through a quarter revolution, in which the major axis of the wheel is horizontal. During this quarter revolution of the wheel 2, the crank arm 4 rotated a half revolution because it rotates at twice the speed of rotation of the traction wheel 2. The crank arm is then upstanding from its axis of rotation, and since the crank pin 6 of the crank arm 4 is pivotally connected to the lower end of the link 7, the crank arm 4 actually lowered the lever 3 into a horizontal position as shown in Fig. 2.

The difference between half of the minor axis and half of the major axis of the tread of the wheel is equal to twice the radius of rotation of the crank pin, and therefore, when the crank pin makes a half revolution from the position shown in Fig. 1 to the position shown in Fig. 2, it lowered the wheel 2 bodily by an amount equal to twice the radius of rotation of the crank arm, and this lowering of the wheel occurred through lowering of the free end of the lever 3. The wheel 2, of course, is fixed on or keyed to a supporting shaft 9, which is rotatably carried on the lever 3, so that as the lever 3 is raised and lowered at its free end, the wheel 2 will be correspondingly raised and lowered. Thus, as the wheel 2 rotated through a quarter of a revolution, so as to move its major axis from an approximately vertical position to an approximately horizontal position, the shaft 9 of the wheel was lowered vertically at the same time so that there would be no vertical movements imparted to the vehicle 1 which is supported from the wheel through the lever 3 and the link 7.

As the vehicle continues to move to the left from the Fig. 2 position into the Fig. 3 position, through another quarter revolution, the crank arm 4 will again take the position shown in Fig. 1 and raise the lever 3 back into the Fig. 1 position. As the vehicle moves farther to the left in Figs. 1 to 4, with the wheel 2 rotating through another quarter revolution, into the Fig. 4 position, the crank arm 4 will return to the Fig. 2 position and lower the lever 3 back into the horizontal position shown in Fig. 2. It will be noted that during the rotation of the crank arm 4 about its axis 5, the lower end of the link 7 can move forwardly and rearwardly as the crank arm moves through horizontal positions. In Fig. 5, the parts are illustrated in a position ⅛ of a revolution in a counter-clockwise direction beyond the Fig. 3 position, at which time the link 7 has swung to the rear in order to accommodate the swing of the crank arm 4. It will thus be apparent that through this mechanism, the rotations of the oblate wheel will not cause any vertical movements of the vehicle 1, because the lever 3, the link 7 and the crank arm 4 shift the shaft 9 of the wheel 2 vertically by the amount of movement that would have been imparted to the vehicle by wheel 2 during a quarter revolution had the shaft 9 been mounted directly on the vehicle.

As will be noted in Fig. 5, the dot-dash line 7a intersects the ground line to the right of the wheel shaft 9, as does the lobe 2a of the wheel 2 contact the ground to the right of wheel shaft 9. Wheel 2 with the vehicle weight on it would tend to rotate counter-clockwise and cause the vehicle to move, but because of the idler gear 18 in the gear train (Fig. 7), gear 19 and crank arm 4 also tend to rotate counter-clockwise, thereby tending to lift the vehicle. Thus, these forces tending to rotate the wheel and to lift the vehicle work against each other and the wheel does not rotate because of gravity, and cause the vehicle to move. Also because of the idler 18, the arm 4 always projects to the correct side of the wheel to cause the effect just explained above.

Referring next to Figs. 6, 7 and 8, the mechanism for driving the crank shaft at twice the rate of rotation of the wheel, and illustrating an actual example of connections between the wheel and the lever 3 and link 7, is illustrated. The lever 3 here is in the form of an arm, to the free end of which a plate 10 is secured, such as by screws 11 with an interposed spacing plate 12. The shaft 9 of the wheel 2 extends through the plate 10 and the basic part of the arm 3 and is rotatably mounted in suitable bearings 13 in the lever 3 and plate 10. In the space between the free end of the lever 3 and plate 10, a gear 14 is fixed on the shaft 9 so as to rotate therewith, and of course the shaft 9 is fixed to the wheel 2 for rotation with it. For convenience, a gear 14 may be keyed to the shaft 9 by key 15, Fig. 7. Also rotatably mounted by the arm 3 and plate 10 and disposed in the space between them, are two additional stub shafts 16 and 17, the shaft 17 being disposed immediately above the shaft 9, and the shaft 16 to one side of the vertical plane through the axes of shafts 9 and 17.

Fixed on the shaft 16 is a pinion 18 which meshes with the gear 14, and fixed on the shaft 17 is a pinion 19 which meshes with the pinion 18 but not with the gear 14. The shaft 17 is a crank shaft whose axis of rotation was designated diagrammatically by the numeral 5 in Figs. 1 to 5. The crank arm 4 is carried by this crank shaft 17, and the free end of the crank arm 4 mounts the crank pin 6 which extends through and has bearing in the lower end of the link 7. For convenience, the link 7 has a boss 20, Fig. 6, through which the crank pin 6 extends and in which it is rotatably mounted, and the free end of the crank pin 6 carries a collar 21 which is secured thereon by a set screw 22.

The gear 14 on the wheel shaft 9 is twice the size of the pinion 19, and pinions 18 and 19 are of the same size. Since the pinion 18 is a mere idler pinion, the gear 14 will drive the pinion 19, and through it the crank shaft, at twice the rate of rotation at which wheel 2 is rotated. The wheel 2 and the shaft 9 may be rotated or driven in any suitable manner, one such mechanism for rotating the wheel 2 being illustrated in Fig. 9.

Referring now to Fig. 9, the lever 3 is pivoted to the vehicle 1 by a shaft 23 which is mounted for rotation on the vehicle. The lever 3 is rockably mounted on this shaft 23. Fixed on the shaft 23 is a gear 24, which meshes with and drives an idler pinion 25 that is rotatably mounted on a shaft 26 carried on a lever 3. A shaft 27 is also carried by the lever 3, and fixed on the shaft 27 are a gear 28 and an oblate sprocket wheel 29. Mounted on the wheel 2 at one side thereof, such as on the shaft 9, is another oblate sprocket wheel 30 which is coupled to and rotates always with the wheel 2.

The major axis of the sprocket wheel 30 is approximately parallel to the major axis of the tread of the wheel 2, and a sprocket chain 31 connects sprocket wheels 29 and 30. As so connected, the major axis of the oblate sprocket wheel 29 is approximately horizontal when the major axis of the sprocket wheel 30 is approximately vertical, and because of this driving connection, the major axes of the sprocket wheels 29 and 30 will always have their major axes at approximate right angles to each other. For example, when the major axis of the sprocket wheel 30 is horizontal, the major axis of the sprocket wheel 29 will be approximately vertical.

The shaft 23 is driven from a suitable source of power on the vehicle at a rate depending upon the speed desired for the vehicle, and the gear 24 on the shaft 23 will drive the gear 28 which is fixed to the sprocket wheel 29. Since the idler 25 and the gear 28 will move with the lever 3 about the axis of the shaft 23, as the free end of the lever 3 moves upwardly and downwardly, the gear 28 will always be driven at approximately the same speed in all the angular positions of the lever 3. When the sprocket wheel 29 is in the position shown in Fig. 9, the chain 31 will be relatively close to the shaft 27 so that its linear speed will be relatively slow. At the same time the chain 31 will be engaging at the ends of the major axis of the sprocket wheel 30, which is the equivalent of a relatively low rate of rotation of the wheel 2.

When the sprocket wheel 29 has its major axis vertical, the major axis of the wheel 30 will be horizontal, and one will have a faster rate of drive of the wheel 2. At intermediate positions of the sprocket wheels 29 and 30, this ratio or drive between the sprocket wheel 20 and the sprocket wheel 30 will vary during each half revolution of the wheel 2, with the result that the wheel 2 will rotate at a somewhat lower speed when its major axis is vertical, and at a much higher rate when its major axis is horizontal. This is necessary in order that vehicle 1 will be moved horizontally at a uniform rate. The rate of rotation of the wheel 2 will be slowest when its major axis is vertical and fastest when its major axis is horizontal, and all of this will be obtained through the shaft 23, which may rotate at a uniform rate.

Referring next to Figs. 10 to 12, a modification is illustrated, in which the oblate wheel 2 is replaced by a wheel 32 which is somewhat triangular in shape. In other words, wheel 32 has three equally spaced, convex, arcuate crests 33. The crests 33 are of relatively short radii, and are connected by convex, arcuate surfaces 34 which have relatively large radii, the ends of which surfaces merge into the bases of the crests 33. This is in contrast to the oblate wheels 2 which had two convex, arcuate crests 2a, Figs. 1 to 5, connected at their ends by broad, convex, arcuate surfaces 2b. This wheel 32, Fig. 10, is fixed to a supporting shaft 35, by which the wheel is rotatably mounted on the free end of the lever 3. This shaft 35 which supports the wheel has a geared connection to a crank shaft, and through a crank pin on the crank arm is connected to the link 7 in a manner similar to that shown in Figs. 6, 7 and 8 except that the drive ratio between the wheel and the crank shaft is 3 to 1, instead of 2 to 1, as in Figs. 6, 7 and 8.

In Figs. 11 and 12, this 3 to 1 gear ratio is illustrated, and for this purpose a gear 36 is keyed on the shaft 35 of the wheel, so as to always rotate with the wheel, and a pinion 37 is keyed on the crank shaft 38 which is rotatably mounted on the lever 3. An idler pinion 39 rotatably mounted on lever 3 meshes with the gear 36 and pinion 37, and the gear 36 is three times the size of the pinion 37, so that you have a 3 to 1 speed ratio. In other words, each rotation of the wheel 32 and gear 36 causes three rotations of the pinion 37 and the crank shaft. The lever 3 is provided with the plate 10, as explained in connection with Figs. 6 to 8, and the crank arm 4 is coupled to the link 7 in the same manner, and corresponding parts have corresponding reference numerals. Thus, in Figs. 10 to 12, the wheel 32, which has three tread crests, will rotate as the vehicle moves endwise, without causing any vertical movements of the vehicle, since the crank connection between the lever 3 and link 7 takes care of this in the same manner that it was taken care of in the arrangement shown in Figs. 1 to 8.

When using the wheel 32, which may be roughly called the triangular wheel, the driving mechanism such as shown in Fig. 9 is not applicable, and therefore mechanism suitable for this purpose is illustrated in Figs. 13 to 16 inclusive, to which reference should now be made.

In this mechanism, a lever 40 replaces the lever 3. The vehicle frame 1, see Fig. 14 is provided with a bearing boss 41, and the lever 40 has a laterally extending, tubular boss 42 which is rotatably mounted in the bearing boss 41 of the frame. A collar 43 fixed on the outer or free end of the boss 42 prevents removal of the arm boss 42 from the bearing boss 41. Instead of employing the link 7, the frame 1 is provided with a horizontally elongated slot or recess 44, and the crank pin 6 is rotatably mounted in a block 45 which is guided for reciprocation horizontally in the recess or slot 44. A plate 46 is confined on the crank pin 6 against a shoulder on the crank arm 4, so as to overlie the face of the vehicle frame 1 enough to always cover the recess or slot 44, yet permit reciprocation of the crank pin 6 along the recess 44.

The lever 40 is provided with three plates 47, 48 and 49 which are disposed side by side but spaced apart by flanges. For example, plates 47 and 49 may have peripheral flanges 50 which extend toward and abut against the opposite faces of the intermediate plate 48, and all of these plates 47, 48 and 49 are secured together in any suitable manner. The crank shaft 38 is rotatably mounted in all of the plates 47, 48 and 49, and the pinion 37 is keyed on the crank shaft 38 between the plates 48 and 49. The idler pinion 39 is similarly mounted for rotation between the plates 48 and 49, and the shaft which supports that idler pinion is rotatably mounted in the plates 48 and 49. The shaft 35 extends through all of the plates 47, 48 and 49, and is rotatably supported by those plates. Fixed on or keyed to the crank shaft 38 is a circular sprocket wheel 51, Fig. 13. Also rotatably mounted in the plates 47, 48 and 49, is a shaft 52.

A circular sprocket wheel 53 is keyed on the shaft 52 in the space between the plates 47 and 48, and a sprocket chain 54 is disposed between the plates 47 and 48 and runs over and drivingly connects the sprocket wheels 51 and 53. Also keyed on the shaft 52 is a gear 55 which is disposed between plates 48 and 49. A drive shaft 56 extends through the tubular boss 42 from inside the vehicle frame, and its outer end extends through the plates 48 and 49.

In the space between the plates 48 and 49, a gear 57 is keyed to the drive shaft 56 so as to rotate therewith. An idler pinion 58 is disposed between plates 48 and 49, with its ends rotatably mounted in plates 48 and 49. This idler pinion 58 meshes with the gear 57 on the drive shaft 56, and also with the gear 55 which is keyed on the shaft 52. Therefore, the drive shaft 56, through its gear 57, the idler pinion 58, the gear 55, the shaft 52, the sprocket wheels 51 and 53, and chain 54, drives the crank shaft 38 which, in turn, rotates the gear 36 at one-third the rate at which the crank shaft rotates. This same drive remains effective as the arm or lever 40 moves vertically at its free end. The horizontal sliding movement of the crank pin 6 in the horizontally elongated recess 44 serves the same purpose as the pivoted connection of pin 6 to link 7.

A cam element 59, Figs. 14 and 15, is provided on one side face with a bearing boss 60, Fig. 14, which extends through a part of the frame 1a, so as to be rotatably mounted in a bearing sleeve 61 in the frame. This boss 60 is concentric with the drive shaft 56, and is coupled to the drive shaft 56 by teeth 62 on the end of shaft 56 which are received in corresponding slots in the passage of the bearing boss 60. This cam 59 is provided in its opposite side face with a cam slot 63, which is eccentric to the axis of rotation of the cam element 59. Another member of the frame 1b, Fig. 14 is provided with a bearing boss 64 which is concentric with the axis of the shaft 56, and a power shaft 65 extends through this boss 64 and is rotatably supported therein through a bearing sleeve 66. An arm 67 is rotatably supported on the exterior of the bearing boss 64 on a bearing sleeve 68 which is concentric with the bearing sleeve 66, and a collar 69 fixed on the free end of the bearing boss 64 confines the arm 67 to the frame for oscillation about the axis of the power shaft 65. The face of the cam element 59 in which the cam slot 63 is provided, also has a recess 70 which is concentric with shaft 65, and the peripheral wall of this recess 70 is provided with gear teeth 71 so as to provide an internal gear. The shaft 65 extends through this recess 70 and has a bearing in the cam element 59 adjacent to the end of the drive shaft 56. Keyed on the shaft 65 within the recess 70 is a pinion or gear 72. A planet gear 73 is disposed in this recess 70, and meshes with the gear 72 and the internal gear 71. This planet gear 73 is rotatably mounted on the cylindrical shaft 74 of a screw 75 which is threaded into the arm 67. A head on the outer end of the shank 74 confines the planet gear to the arm 67, so that as the arm 67 is oscillated, it will move the planet gear 73 to a limited extent about the shaft 65.

Another arm 76, Fig. 15, is pivoted at one end by a pivoted pin 77 to another part 1c of the frame, and it extends along that face of the cam element 59, in which the cam slot 63 is provided. A cam roller 78 is pivotally confined to a side of the arm 76, and it runs in the cam slot 63. The free end of this arm 76 is connected by a pivot pin 79 to one end of a link 80, the other end of which is connected by a pivot pin 81 to the free end of the arm 67. The cam slot 63 is eccentric to the shaft 65, and therefore, when the cam element 59 is rotated, the eccentricity of the slot 63 will act through the roller 78 to oscillate the arm 76, and this arm, through the link 80, will correspondingly oscillate the arm 67, and through the latter shift the planet gear 73 bodily back and forth to a limited extent about the axis of shaft 65.

The operation of the mechanism is as follows:
The power shaft 65 is suitably driven from any source of power on the vehicle, such as by an engine or an electric motor, and there may be two sets of shafts 65 disposed in end to end relation and each preferably driven by their individual power source, as is common in ordinance and caterpillar type vehicles, and which is therefore not illustrated here. The shaft 65, being driven at a selected rate, will rotate the gear 72 which is keyed to it, and the planet gear 73 which meshes with gear 72 will act as an idler gear and rotate the internal gear formed by the teeth 71 in the cam element 59. Since the gear 73 is held against bodily movement or translation by the arm 67, this provides a direct transfer of rotative power between the gear 72 and the power shaft 65 and the cam element 59.

The cam element 59 being coupled to the shaft 65, will serve to drive the wheel 32 through the mechanism shown in Fig. 13, and in the lower half of Fig. 14. As the cam element 59 rotates in this manner, the arm 76 will be oscillated upwardly and downwardly, and it will shift the planet gear 73 upwardly and downwardly to a limited extent. When the planet gear 73 is bodily shifted in this manner by the arm 67, it changes the rate of gear drive between the gear 72 and the cam element 59. When the arm 67 is elevated so as to carry the planet gear 73 upwardly in Fig. 15, the result will be to decelerate the rate at which the cam element 59 is driven from the power shaft 65, and when the arm 67 is lowered, it will accelerate the rate of drive between the power shaft 65 and the cam element 59.

This acceleration and deceleration of the speed at which the drive shaft 56 is operated from the power shaft, provides the variable speed of the generally triangular traction wheel 32, so that the rate of rotation of the traction wheel 32 will be slowest when a crest 33 is in contact with the ground surfaces and will be a maximum when the intermediate arcs 34 of the wheel tread are in contact with the ground surfaces. In other words, the cam slot 63 is so arranged in the cam element that when a crest 33 has come in contact with the ground, deceleration has been completed, and then the acceleration begins and continues until the middle of an arc 34 is in contact with the ground. From then on, deceleration begins and continues until the next crest is in contact with the ground surfaces, whereupon acceleration again begins. Thus, uniform operation of shaft 65 will cause the generally triangular traction wheels to propel the vehicle at a uniform rate. It will be understood that wheels with more than three convex, arcuate crests may be employed if desired.

In Fig. 14a a modified form of connection between the vehicle frame and the crank pin is illustrated. In this construction the vehicle frame is provided with a recess 82, similar to the recess 44 but larger, and a bearing member 83 is mounted in this recess 82 for limited vertical movement. The ends of this member 83 have flanges 84 that have sliding engagement with the ends of the recess 82 and guide the member 83 in its vertical movements without binding. The member 83 is itself provided with a horizontally elongated recess 85 in which a block 86 is disposed to slide horizontally to a limited extent. The crank pin 6 is pivoted in this block 86. Coil springs 87 are disposed above and below both ends of member 83 between it and the top and bottom walls of the recess 82, and are under compression, so that they resiliently resist vertical movements of member 83 in both directions. The recess 82 may be closed by a face plate similar to the plate 46 of Fig. 14. The floatingly mounted member 83 thus absorbs road shocks or those due to irregularities in the roadway.

Referring next to Figs. 17 to 19, the vehicle 1 may be of any suitable shape or design, but in this particular form illustrated, a rocking arm 88 is disposed on each side of the frame 1 and pivoted thereto midway of its length, each upon a shaft 89 which is rotatably supported on frame 1. Each shaft 89 corresponds to the drive shaft 56 of Fig. 14, and the arm 88 is similar to arm 40 of Figs. 13 and 14 except that arm 88 extends equal distances in both directions from the shaft 89 on which it is pivoted. A traction wheel 90, oblate in shape, with a tread that is oblate, is mounted on each end of each arm 88 and driven from shaft 89 in the same manner that wheel 2 is driven from shaft 23 in Fig. 9, except that gear 24 is common to the drives leading to both wheels on each arm 88, and the major axis of the front wheel 90 is vertical when the major axis of the rear wheel 90 on the same arm 88 is horizontal. In other words, the connections of the drives from each wheel 90 on each arm 88 will always keep the major axes of the treads of these wheels approximately crosswise of each other in all rotative positions of the wheels. As shown in Fig. 19, this is accomplished by coupling the sprocket wheels 29 to the common drive shaft gear 24, through idler gears 25 and gears 28, with their major axis extending in directions at right angles to each other, and each pair of chain-connected sprocket wheels 29 and 30 will have their major axis extending in directions at right angles to each other. In Figs. 17–19 the link 7 of Fig. 9 is replaced with one of the horizontal sliding connections between the crank pin 6 and the frame 1, which is shown in Figs. 13, 14 and 14a. It will be understood that this horizontal, sliding mounting of the crank pin 6 in the vehicle frame may be used interchangeably with the link 7 in any form of the drive.

It is believed that the principle of operation will be understood from the foregoing explanation. The traction advantages of the non-circular periphery of the traction wheels are obtained with all of the illustrated forms of drive, yet the vehicle will travel smoothly at all speeds. The generally triangular shape of wheel gives more ground clearance than the oblate wheel. The exact wheel periphery may be determined by rotating an approximately shaped wheel from the drive shaft, while the wheel is held from contact with the ground, but in contact with an abrasive surface.

It will be understood that various changes in the details and arrangements of parts which have been hereindescribed and illustrated in order to explain the nature of the invention, may be made by those skilled in the art within the principle and scope of the invention as expressed in the appended claims.

I claim:

1. A vehicle having a body frame, a plurality of rolling supports for said vehicle spaced apart on the vehicle, one of which is a driving support and includes an arm pivoted to said frame and extending therefrom generally horizontally in a direction lengthwise of the vehicle and terminating in a free end, a wheel rotatably mounted on said free end of said arm and having a continuous periphery with a plurality of arcuate humps spaced equally about the axis of rotation of the wheel and connected together by convex, arcuate curves that are closer to the axis of rotation of the wheel than the crests of said humps, a main gear connected to the wheel for rotation therewith concentrically with the axis of rotation of said wheel, a shaft rotatably mounted on said free end of said arm, a second gear fixed on said shaft, to rotate therewith, an idler gear also rotatably mounted on said free end of said arm and meshing with said main and second gears, a crank arm fixed on said shaft to extend radially therefrom and terminating in a crank pin, a coupling connecting said crank pin to said vehicle frame, with limited forward and rearward movement of said pin on said frame, and driving means on said arm drivingly connected to one of said gears and through it causing rotation of said wheel and said crank arm.

2. The vehicle substantially as set forth in claim 1, having said coupling from the crank pin to said frame resiliently mounted on said frame for limited vertical movement.

3. A vehicle comprising a body frame and a plurality of rolling supports spaced apart on the vehicle frame, one of said supports being a driving support and includes a wheel whose peripheral tread is formed of a plurality of arcuate humps spaced equally about the axis of rotation of the wheel and connected together by convex, arcuate curves of greater radii of curvature than of the humps that are closer to the center of the wheel than the crests of the humps, a gear coupled to said wheel concentrically of said wheel to rotate therewith for all movements of rotation and translation of the wheel, a member rotatably mounting said wheel for rotation about an axis through said wheel center, and in turn mounted on said frame for limited vertical pivotal movement thereon, a crank arm pivoted on said member eccentrically of the axis of rotation of said wheel, an operative connection between said gear and said crank arm causing rotation of said gear and crank arm at the same time at a selected speed ratio, said arm having a crank pin on its free end, a coupling connecting said crank pin to said frame with limited forward and rearward movement of the pin relatively to the frame, and driving means on said member connected to and operating said operative connection between said arm and gear and thereby causing rotation of said wheel and said arm at said selected speed ratio.

4. The vehicle substantially as set forth in claim 3, and said coupling itself being resiliently mounted on said frame for limited vertical movement.

5. A vehicle comprising a body frame and a plurality of rolling supports spaced apart on the vehicle frame, one of said supports being a driving support and includes a wheel whose peripheral tread is formed of a plurality of arcuate humps spaced equally about the axis of rotation of the wheel and connected together by convex, arcuate curves that are closer to the center of the wheel than the crests of the humps, a gear drivingly coupled to said wheel concentrically of said wheel center to move therewith for all movements of rotation and translation of the wheel, a member rotatably mounting said wheel for rotation about an axis through said wheel center, and in turn mounted on said frame for limited vertical movement thereon of the wheel mounting part of said member, a crank arm pivoted on said part of said member eccentrically of the axis of rotation of said wheel, means on said member and drivingly connecting said arm to said wheel gear for said arm to be driven at a selected ratio, said arm having a crank pin on its free end, said frame having a horizontally elongated slot into which said crank pin extends and along which it moves as the crank arm rotates, and driving means on said member connected to and rotating said means on said member that connects said arm to said wheel gear, and through the latter causing rotation of said wheel.

6. A vehicle comprising a body frame and a plurality of rolling supports spaced apart on the vehicle frame, one of said supports being a driving support and includes a wheel whose peripheral tread is formed of a plurality of arcuate humps spaced equally about the axis of rotation of the wheel and connected together by convex, arcuate curves that are closer to the center of the wheel than the crests of the humps, a gear drivingly coupled to said wheel concentrically of said wheel center to move therewith for all movements of rotation and translation of the wheel, a member rotatably mounting said wheel for rotation about an axis through said wheel center, and in turn mounted on said frame with a part of said member having limited vertical movement with respect to the frame, a crank arm pivoted on said member eccentrically of the axis of rotation of said wheel, means connecting said arm to said wheel gear to rotate the arm from said wheel at a selected ratio, said arm having a crank pin on its free end, an element having a horizontally elongated slot into which said crank pin extends and along which the pin may reciprocate as the crank arm rotates, a resilient suspension between said element and frame by which said element may have limited vertical movement, relatively to the frame, which is resiliently opposed, and driving means on said member connected to and driving said means that connects said crank arm to said wheel gear and through it causing rotation of said wheel and arm.

7. A vehicle having a body frame, a plurality of rolling supports for said vehicle spaced apart on the vehicle, one of which is a driving support, and includes an arm pivoted to said frame and extending therefrom generally horizontally in a direction lengthwise of the vehicle and terminating in a free end, a wheel rotatably mounted on a free end of said arm and having a continuous periphery with a plurality of arcuate humps spaced equally about the axis of rotation of the wheel and connected together by convex, arcuate curves that are closer to the axis of rotation of the wheel than the crests of said humps, a main gear connected to the wheel for rotation therewith concentrically with the axis of rotation of said wheel, a shaft rotatably mounted on the free end of said arm, a second gear fixed on said shaft, to rotate therewith, an idler gear also rotatably mounted on said free end of said arm and meshing with said main and second gears, a crank arm fixed on said shaft to extend radially therefrom and terminating in a crank pin, a coupling connecting said crank pin to said vehicle frame, with limited forward and rearward movement of said pin on said frame, the gear ratio of the main gear to the second gear being equal to the ratio of the number of convex crests on said wheel periphery to one, and driving means on said arm connected to and driving one of said gears between said arm and wheel and through it causing rotation of said wheel and arm.

8. A vehicle having a body frame, a plurality of rolling supports for said vehicle spaced apart on the vehicle, one of which is a driving support and includes an arm pivoted to said frame and extending therefrom generally horizontally in a direction lengthwise of the vehicle and terminating in a free end, a wheel rotatably mounted on a free end of said arm and having a continuous periphery with a plurality of arcuate humps spaced equally about the axis of rotation of the wheel and connected together by convex, arcuate curves that are closer to the axis of rotation of the wheel than the crests of said humps, a main gear connected to the wheel for rotation therewith concentrically with the axis of rotation of said wheel, a shaft rotatably mounted on the free end of said arm, a second gear fixed on said shaft, to rotate therewith, an idler gear also rotatably mounted on said free end of said arm and meshing with said main and second gears, a crank arm fixed on said shaft to extend radially therefrom and terminating in a crank pin, a coupling connecting said crank pin to said vehicle frame, with limited forward and rearward movement of said pin on said frame, a power operated shaft on said vehicle, and a driving connection from said power operated shaft to one of said gears and through said gears causing rotation of said wheel, said driving connection including an intermediate motion transmitting gear concentric with the pivotal mounting of said arm on said frame, and means included in said driving connection and causing operation of the wheel at a lower angular speed when any of the crests of the wheel periphery is lowermost than when the center of any arcuate connecting curve is lowermost.

9. The vehicle substantially as set forth in claim 8, having as the coupling between said crank pin and the frame, an element with a horizontally elongated recess in and along which the crank pin runs as the crank arm rotates, and a resilient support between said element and said frame permitting limited but resiliently opposed vertical movements of said member on said frame.

10. A vehicle having a body frame, a plurality of rolling supports for said vehicle spaced apart on the vehicle, one of which is a driving support and includes an arm pivoted to said frame and extending therefrom generally horizontally in a direction lengthwise of the vehicle and there terminating in a free end, a wheel rotatably mounted on the free end of said arm and having a continuous periphery with a plurality of arcuate humps spaced equally about the axis of rotation of the wheel and connected together by convex, arcuate curves that are closer to the axis of rotation of the wheel than the crests of said humps, a main gear connected to the wheel for rotation therewith concentrically with the axis of rotation of said wheel, a shaft rotatably mounted on the free end of said arm, a second gear fixed on said shaft, to rotate therewith, an idler gear also rotatably mounted on said free end of said arm and meshing with said main and second gears, a crank arm fixed on said shaft to extend radially therefrom and terminating in a crank pin, a coupling connecting said crank pin to said vehicle frame, with limited forward and rearward movement of said pin on said frame, the pivotal connection of said arm to said frame body including a driving shaft rotatably mounted on said frame body and on which said arm is rotatably mounted, a primary gear fixed on said driving shaft, and a driving connection on said arm between said primary gear and said first mentioned shaft.

11. A vehicle comprising a body frame, and a plurality of rolling supports therefor spaced apart on said frame, one of said supports being a driving support and including a main shaft disposed in a position crosswise of the frame and rotatably mounted on said frame, a rocking arm pivoted on said shaft and extending generally horizontally in a direction lengthwise of the frame, a gear fixed on said shaft, a short shaft rotatably mounted on said arm with its axis parallel to the axis of said main shaft, a second gear fixed on said short shaft to rotate therewith, an idler gear rotatably mounted on said arm and meshing with both of said gears, a traction wheel rotatably mounted on the free end of said arm and having a periphery that is non-circular, a drive gear fixed to said wheel to rotate therewith, a crank shaft rotatably carried on the free end of said arm at one side of the axis of said wheel, a pinion fixed on said crank shaft to rotate therewith, an idler pinion rotatably carried by the free end of said arm and meshing with said gear fixed to said wheel and said pinion on said crank shaft, a positive drive on said arm from said second gear to said crank shaft, a crank arm fixed on said crank shaft and having a crank pin on its free end, means rotatably connecting said crank pin to said frame with said crank pin movable horizontally relatively to said frame for at least double the radius of rotation of the crank pin and sufficient to allow complete rotation of said crank shaft, and driving means on said frame for rotating said main shaft.

12. The vehicle as set forth in claim 11, and said driving means including a power shaft rotatable on said frame in endwise alinement with said main shaft, a member fixed on said main shaft and having an annular flange extending over an end of said power shaft and provided with internal teeth to form an internal gear, a pinion on said power shaft within said internal gear, an oscillating arm mounted to rock about said power shaft, a planet gear rotatably mounted on said oscillating arm and meshing with said internal gear and said pinion on said power shaft, a cam carried by said member, a cam follower guided by said cam, a lever pivoted on said frame and mounting said cam follower, and a link pivoted at its ends to the free ends of said lever and of said oscillating arm, whereby said cam will cause oscillations of said oscillating arm and through it cause backward and forward translation of said planet gear along said internal gear.

13. A vehicle comprising a body frame, and a plurality of rolling supports therefor spaced apart on said frame, one of said supports being a driving support and including a main shaft disposed in a position crosswise of the frame and rotatably mounted on said frame, a rocking arm pivoted on said shaft and extending generally horizontally in a direction lengthwise of the frame, a power shaft supported by said frame for rotation in endwise alinement with said main shaft, a member fixed on an end of said main shaft and having an internal gear surrounding the adjacent end of said power shaft, a pinion fixed on said power shaft in approximate radial alinement with said internal gear, an oscillating arm mounted on said frame to rock about said power shaft, a planet gear rotatably mounted on said oscillating arm and meshing with said internal gear and said pinion on the power shaft, a cam carried by and rotating with said member, a cam follower guided by said cam, a lever pivoted on said frame and mounting said cam follower, a link pivoted at its ends to the free ends of said lever and said oscillating arm, whereby said cam will cause rocking of said oscillating arm and through it backward and forward translation of said planet gear along said internal gear, a wheel rotatably mounted on a free end of said rocking arm and having a non-circular periphery, a crank shaft rotatably mounted on the free end of said rocking arm, a driving coupling between said crank shaft and wheel, a crank arm fixed on said crank shaft and having a crank pin on its free end, said frame and said crank pin being connected for horizontal movement of said crank pin relatively to said frame as said crank shaft rotates, and a positive driving connection from said main shaft to said driving coupling between the crank shaft and wheel, by which said wheel and crank shaft are operated.

14. A vehicle having a body frame, a plurality of rolling supports for said frame, spaced apart thereon, one of said supports including an arm pivoted to said frame and extending therefrom generally horizontally in the direction of travel of the vehicle and there terminating in a free end, a wheel rotatably mounted on said free end of said arm and having, as its periphery, a plurality of arcuate humps of relatively short radii of curvature, spaced equally about the axis of rotation of the wheel and connected together by convex, arcuate curves that are closer to the axis of rotation of the wheel than the crests of said humps and of relatively large radii of curvature, a main gear connected to said wheel for rotation therewith concentrically with the axis of rotation of the wheel, another gear rotatably mounted on the free end part of said arm, but clearing said main gear, an idler gear also rotatably mounted on said free end part of said arm and meshing with said main and said another gear, a crank arm coupled to said another gear to extend outwardly from the axis of rotation of said another gear and terminating in a crank pin, and coupling means connecting said crank pin to said vehicle frame and providing limited forward and rearward movement of said pin relatively to said frame, the gear ratio between said main gear and said another gear being equal to the ratio of the number of said humps to one, said crank arm being angularly positioned on its axis of rotation to elevate the free end of said arm when a crest of the wheel periphery engages the ground and lower said free end of said arm when one of said connecting curves engages the ground, the extent of raising and lowering being equal to the vertical travel of the axis of rotation of the wheel.

15. A vehicle having a body frame, a plurality of rolling supports for said frame, spaced apart thereon, one of said supports including an arm pivoted to said frame and extending therefrom generally horizontally in the direction of travel of the vehicle and there terminating in a free end, a wheel rotatably mounted on said free end of said arm and having, as its periphery, a plurality of arcuate humps of relatively short radii of curvature, spaced equally about the axis of rotation of the wheel and connected together by convex, arcuate curves that are closer to the axis of rotation of the wheel than the crests of said humps and of relatively large radii of curvature, a main gear connected to said wheel for rotation therewith concentrically with the axis of rotation of the wheel, another gear rotatably mounted on the same free end part of said arm, but clearing said main gear, an idler gear also rotatably mounted on said free end part of said arm and meshing with said main and said another gear, a crank arm coupled to said another gear to extend outwardly from the axis of rotation of said another gear and terminating in a crank pin, coupling means connecting said crank pin to said vehicle frame and providing limited forward and rearward movement of said pin relatively to said frame, the gear ratio between said main gear and said another gear being equal to the ratio of the number of said humps to one, said crank arm being angularly positioned on its axis of rotation to elevate the free end of said arm when a crest of the wheel periphery engages the ground and lower said free end of said arm when one of said connecting curves engages the ground, the extent of raising and lowering being equal to the vertical travel of the axis of rotation of the wheel, a source of power on said body frame, and a driving connection from said source of power to said another gear, said driving connection operating said wheel at a lower angular speed when any crest of the wheel periphery is lowermost than when the center of any arcuate connecting curve is lowermost.

References Cited in the file of this patent

UNITED STATES PATENTS

| | | |
|---|---|---|
| 2,256,570 | Kopczynski | Sept. 23, 1941 |
| 2,711,221 | Kopczynski | June 21, 1955 |